No. 888,658. PATENTED MAY 26, 1908.
F. W. SCHROEDER.
FLUID OR WATER JACKET CONNECTION.
APPLICATION FILED JAN. 4, 1907.
6 SHEETS—SHEET 1.

Witnesses
H. Dalgaard.
J. Patrick

Inventor
Fritz Wilhelm Schroeder
by Elwin W. Hulse,
his Attorney

No. 888,658. PATENTED MAY 26, 1908.
F. W. SCHROEDER.
FLUID OR WATER JACKET CONNECTION.
APPLICATION FILED JAN. 4, 1907.
6 SHEETS—SHEET 3.
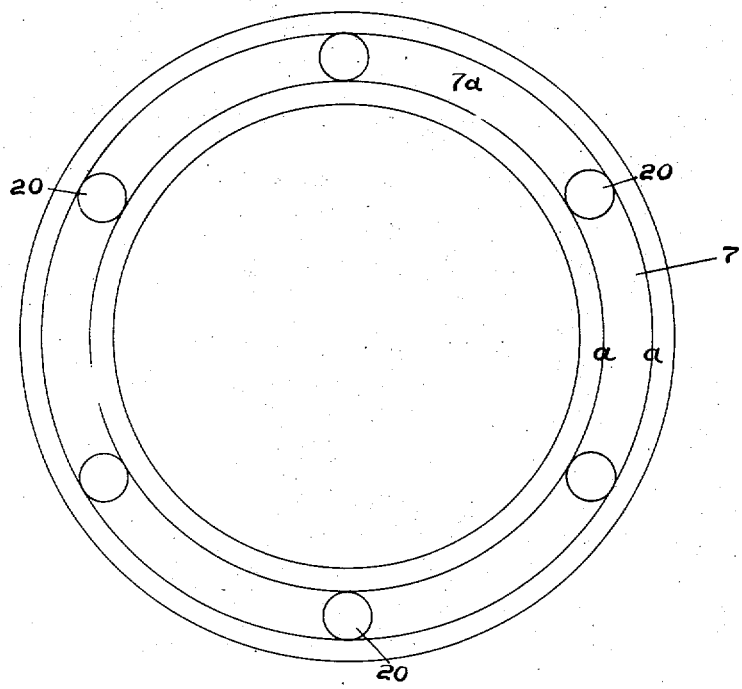
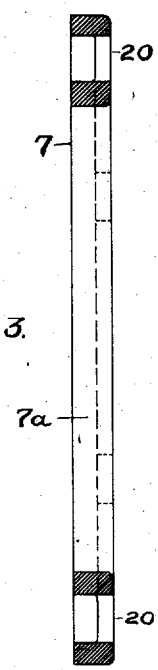
Fig. 3.
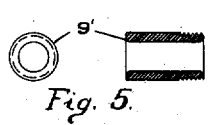
Fig. 5.
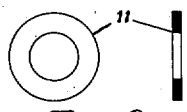
Fig. 6.
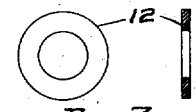
Fig. 7.
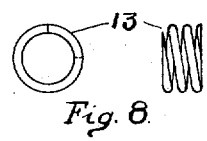
Fig. 8.
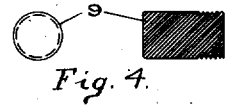
Fig. 4.
Witnesses
H. Dalgaard.
J. Patrick
Inventor
Fritz Wilhelm Schroeder
by Elwin W. Hulse,
his Attorney No. 888,658. PATENTED MAY 26, 1908.
F. W. SCHROEDER.
FLUID OR WATER JACKET CONNECTION.
APPLICATION FILED JAN. 4, 1907.
6 SHEETS—SHEET 4.

Witnesses
H. Dalgaard
J. Patrick

Inventor
Fritz Wilhelm Schroeder
by Elwin M. Hulse
his Attorney

No. 888,658. PATENTED MAY 26, 1908.
F. W. SCHROEDER.
FLUID OR WATER JACKET CONNECTION.
APPLICATION FILED JAN. 4, 1907.

Witnesses
H. Dalgaard.
J. Patrick

Inventor
Fritz Wilhelm Schroeder.
by Elwin M. Hulse
his Attorney

UNITED STATES PATENT OFFICE.

FRITZ WILHELM SCHROEDER, OF BRIDGEPORT, CONNECTICUT, ASSIGNOR TO ROTENG ENGINEERING CORPORATION, OF NEW YORK, N. Y., A CORPORATION OF NEW YORK.

FLUID OR WATER JACKET CONNECTION.

No. 888,658.　　　Specification of Letters Patent.　　　Patented May 26, 1908.

Application filed January 4, 1907. Serial No. 350,812.

*To all whom it may concern:*

Be it known that I, FRITZ WILHELM SCHROEDER, a subject of the King of Denmark, residing at Bridgeport, in the county of Fairfield and State of Connecticut, have invented a new and useful Fluid or Water Jacket Connection, of which the following is a specification.

My invention relates to improvements in fluid connections between the rotating and stationary parts of machinery generally, and is herein shown for the sake of illustration and description as embodied in an air compressor of the rotary type.

The object of my invention is to provide a novel, simple and efficient means for conveying fluid between the moving and stationary parts of machines, particularly between the stationary portion or frame and the rotating portion or cylinder structure of an air compressor of the rotary type, when my invention is embodied in such a mechanism.

The various advantages obtained by the use of my invention will be fully and clearly apparent from the description herein given.

Figure 1:
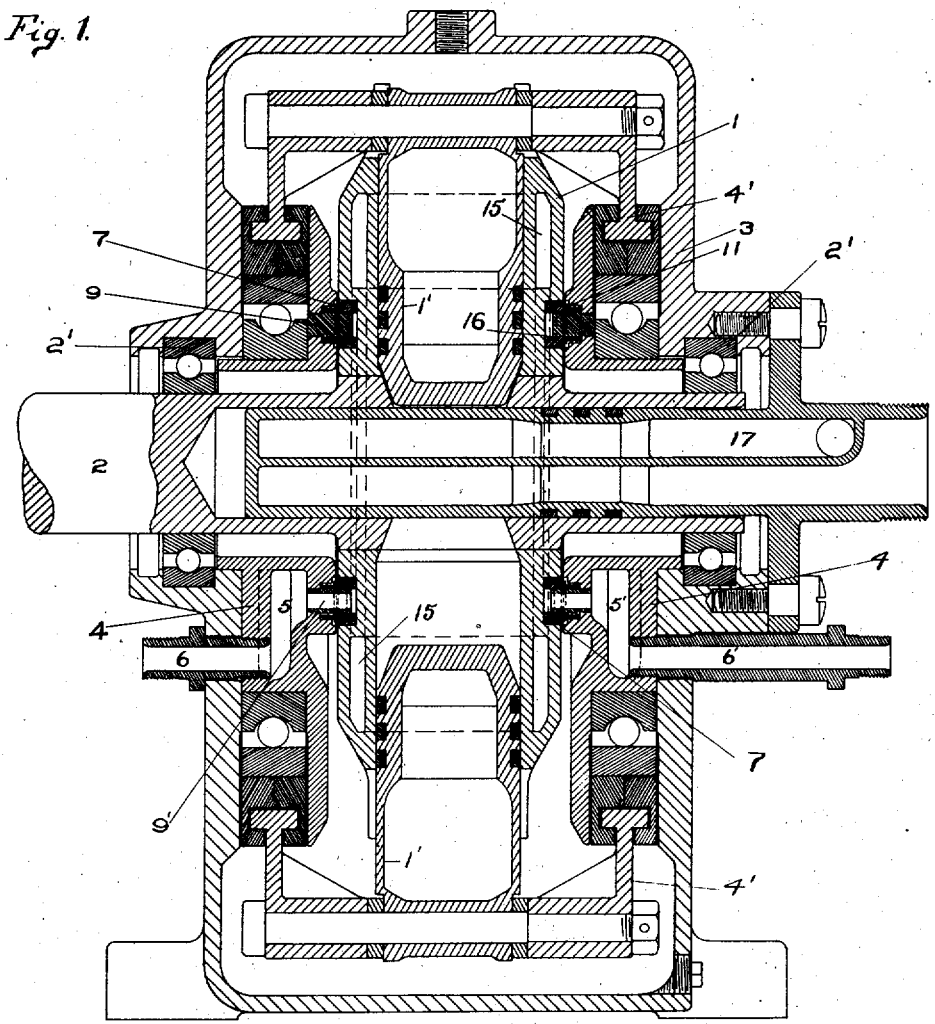
Figure 2:
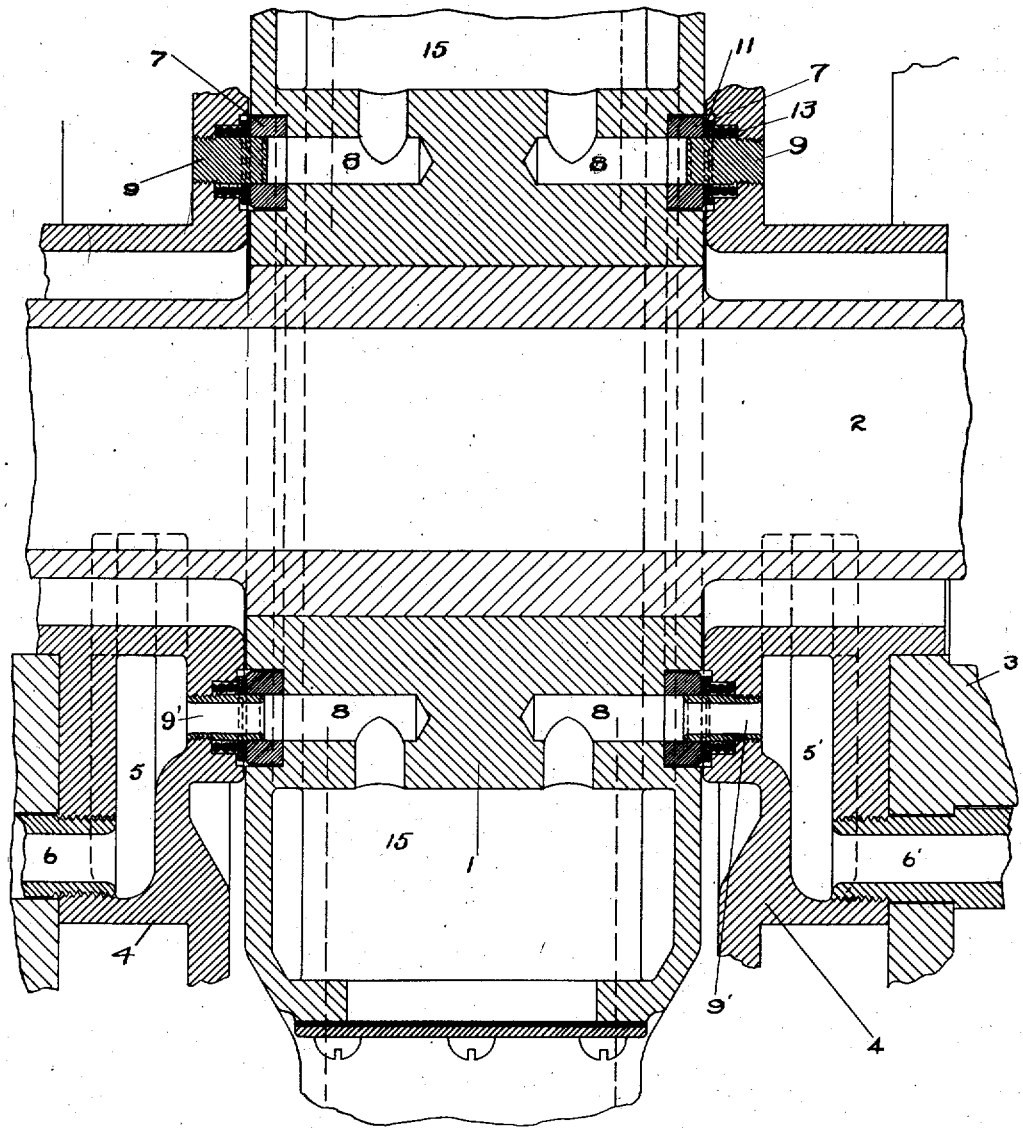
Figure 9:
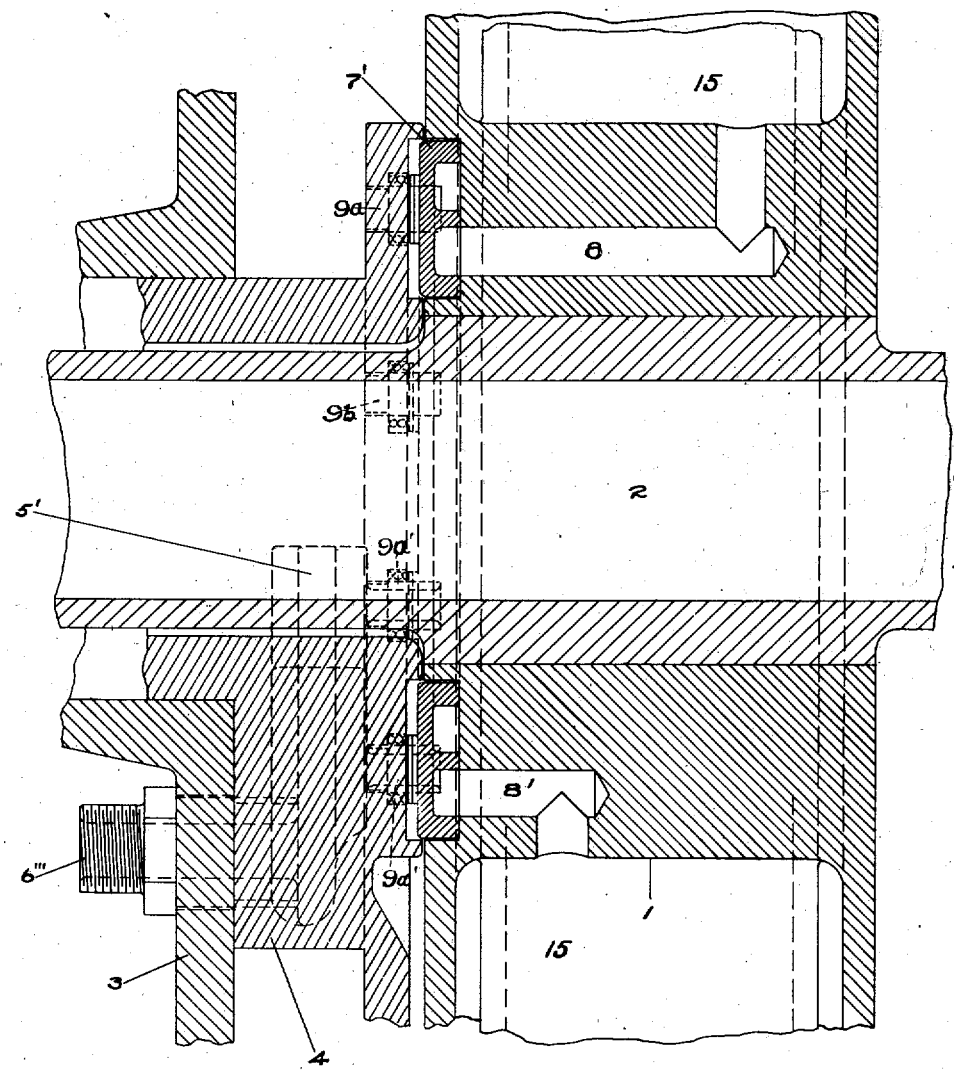

In the drawings Figure 1 is a longitudinal section of an air compressor provided with my invention; Fig. 2 an enlarged longitudinal section of a portion of the mechanism taken in a plane half way between the cylinders of the compressor; Figs. 3, 4, 5, 6, 7 and 8, detail views of the connecting mechanism; Fig. 9, a view similar to Fig. 2, but illustrating a modification, and Figs. 10 and 11, detail views of the connecting mechanism as adapted in Fig. 9.

For the purpose of fully explaining the nature of my invention and illustrating one exemplification or embodiment thereof in a complete operative mechanism I have chosen to illustrate and describe it in connection with and embodied in an air compressor of the rotary type, in which the cylinders are mounted on and rotate with a shaft, the shaft being borne by suitable bearings in a stationary frame, the cylinders being cored to furnish a water jacket for the purpose of cooling the same. The compressor obviously may be connected to or operated by any source of power, as an electric motor, steam engine or the like. It will be understood, further, that with proper mechanical changes my invention is applicable to other machines with the same results as are accomplished when used in connection with an air compressor, as herein illustrated and described. Consequently, I contemplate using my invention wherever applicable.

The preferred form and arrangement of my mechanism is illustrated in the drawings.

In Fig. 1 the rotating portion of the compressor is made up of a plurality of cylinders 1 radially mounted on a shaft 2, the shaft being carried by suitable bearings 2' in the case or frame 3. Eccentric bearings 4 carried by or a part of the case 3 serve as bearing surfaces on which suitable piston suspending devices 4' rotate. A suitable valve 17 attached to the frame 3 is operative within the shaft 2 to supply and exhaust the air to and from the cylinders. Within eccentric bearings 4 or frame 3 are formed suitable cavities 5 and 5' which are provided with suitable connections 6 and 6' to which connections are attached the source of fluid supply and discharge respectively.

Mounted on the inner face of each eccentric bearing 4—that is, the face opposed to the rotating part, and concentric with the axis of rotation of the rotating portion of the mechanism, is a part 7, which is provided with an annular groove 7ª. This part 7, which may be of any suitable form, is shown in the drawings as a ring or annulus of V shaped cross-section, with the hollow or groove side toward the rotating part. This ring 7 is mounted on the bearing 4 by suitable supports or pins 9 and 9', some of which are hollow to form fluid conduits, as shown in Figs. 1 and 5, and communicate with cavity 5. Suitable holes 20 in ring 7 permit the entrance of the extremities of pins 9 and 9', a fluid tight joint between said ring and each pin being maintained by any common or ordinary form of packing, as by packing disks 11, metal washers 12 and elastic material 13. This elastic material, such as spring 13, which I prefer to have carried by the pin, is inserted between the face of ring 7 or disk 11 and the face of eccentric bearing 4. This spring tends to keep ring 7 in close contact with the face of the rotating portion of the device and also to keep a tight joint between the packing disk, the pin, washer and the said ring. I preferably provide an annular recess 16 on each side of the rotating part in which ring 7 is operative.

A suitable number of holes or ports 8 are provided in the face of the rotating part 1 which communicate with a fluid coring 15 within part 1. These holes or ports 8 must be of such shape as to describe a path within the limits a—a of the annular groove $7^a$ in ring 7.

Fluid may now enter through either one of the connections 6 and 6'—say connection 6, into cavity 5. It then passes through hollow pins 9' into groove $7^a$ of ring 7, thence through ports 8 into the coring 15, thence out through port 8 on the other side of the rotating part into groove $7^a$ of the ring 7 through the hollow pins 9' into the cavity 5' in the stationary part on that side of the mechanism. The fluid then escapes through connection 6'.

As shown in the drawings, the connecting construction above described is in duplicate; that is, the fluid connecting device on one side of the mechanism is identical with that on the other side, so that either side will act as the admission portion and the other as the exit portion. It follows that regardless of the rotation of the moving portion of the mechanism, fluid supplied at connection 6 or 6' is free to flow through the stationary portion into and through the rotating portion and out through the corresponding course provided on the opposite side of the mechanism, a fluid tight joint being maintained at all times between both portions.

It is apparent that the part 7 which is shown as mounted on the stationary portion of the mechanism can be equally well mounted in a similar or equivalent manner on the rotating portion. The operation of the device with such mounting of part 7 will be identical with that heretofore described.

Figure 10:
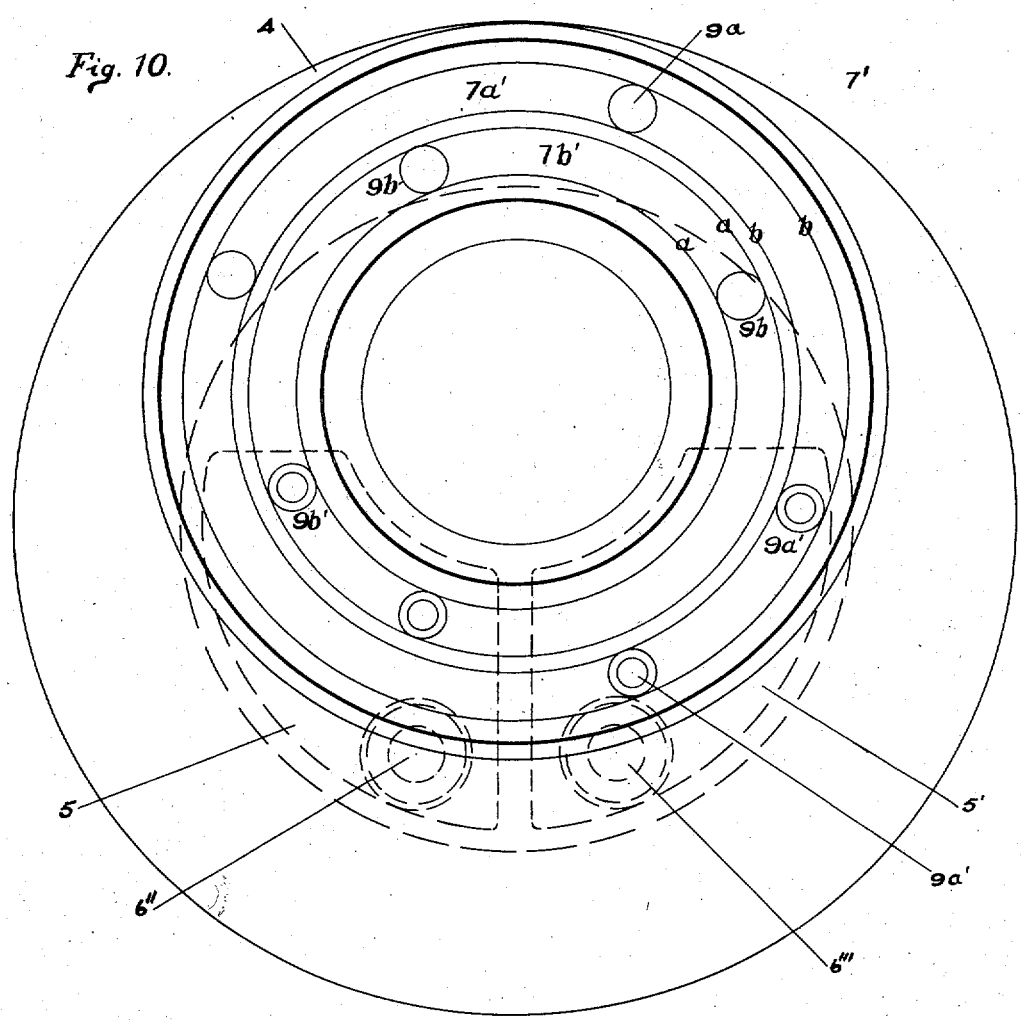
Figure 11:
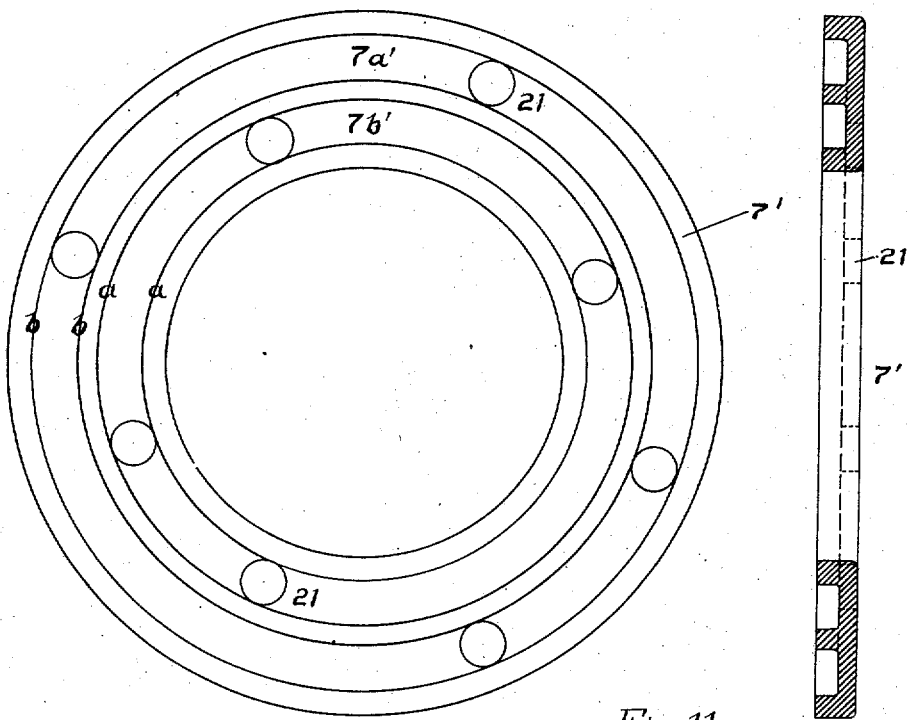

It is obviously within the scope of the invention to employ, instead of part 7 having one annular groove, a part having two annular grooves so that the cross-section would be W shaped. Such a structure could be applied to either side of the rotating part and the opposing face of the frame. Figs. 9, 10 and 11 illustrate this modification. In this modification cavity 5 must be subdivided into compartments 5 and 5' and these compartments should have suitable connections 6" and 6"' respectively for inlet and outlet of fluid. Ring 7' is provided with two annular grooves $7^{a'}$ and $7^{b'}$. Each groove is provided with suitable holes 21 which permit the entrance of pins $9^a$, $9^{a'}$, $9^b$ and $9^{b'}$, pins $9^{a'}$ and $9^{b'}$ being hollow and in communication with grooves $7^{a'}$ and $7^{b'}$ and compartments 5 and 5' respectively. In all other respects the construction of the ring, pins and means for holding the same fluid tight on the rotating part is identical with the arrangement heretofore described. Passages or ports 8 and 8' leading to the coring 15 within the rotating portion of the mechanism are suitably arranged in the rotating part so that they come within the limits a—a and b—b respectively of ring 7'. Fluid entering through one of the connections 6", 6"'—say connection 6", passes into the compartment 5, thence through hollow pins $9^{a'}$ into groove $7^{a'}$, thence through port 8 into the coring 15, thence out through port 8' into groove $7^{b'}$ through hollow pins $9^{b'}$ into compartment 5', thence out through connection 6"'. If connection 6"' is used for inlet of fluid the action or procedure of the fluid through the mechanism is in the reverse manner. This operation is true, no matter in which direction the rotating part revolves. It is apparent that in the latter modification ring 7' could as well be mounted on the rotating part as on the stationary part and either construction be equally within the scope of the invention.

As hereinbefore referred to, the machine herein shown and described is here selected as best illustrating my invention, and consequently my invention is not limited to any special features thereof not directly concerned, inasmuch as various mechanical changes might be made without departing from the spirit and scope of my invention and claims.

What I claim is:

1. In a device of the class described the combination with a machine having a rotating member and a stationary member, of ports in one of said members, supports in the other member, some of which supports are hollow, a grooved part loosely mounted on said supports, the groove thereof being in communication with said ports and said hollow supports, and means carried by said supports for holding said grooved part fluid tight against the other member and for rendering said supports fluid tight in said grooved part.

2. In a device of the class described the combination with a machine having a rotating member and a stationary member each member having a fluid cavity or coring, of an annularly grooved part loosely mounted on one of said members, means between said part and said member by which said part is held fluid tight against the other member, and means whereby the fluid in the cavity or coring of one member is conveyed into the groove of said annularly grooved part and from said groove into the cavity or coring of the other member.

3. In a device of the class described the combination with a machine having a rotating member and a stationary member, each member being provided with a fluid cavity or coring, of an annularly grooved ring or annulus loosely mounted on fluid conduits carried by one of said machine members and in spring contact with the other machine member, the groove of said ring or annulus being in communication through ports and said conduits in said machine members with said cavities or corings, and means carried by said conduits for rendering them fluid tight in said ring or annulus.

4. A fluid connecting mechanism for machines consisting of an annularly grooved ring or annulus, holes through said ring or annulus leading into the grooved portion thereof, pins in said holes by which said ring or annulus is mounted, a portion of said pins being hollow, and means carried by said pins for rendering them fluid tight in said holes.

5. In a fluid connecting mechanism for machines the combination with a machine having a rotating member and a stationary member, each of said members having a fluid cavity or coring, of an annularly grooved part mounted on the stationary member, and having its grooved portion in contact with the rotating member, hollow pins or other conduits in said grooved part communicating with the cavity in said stationary member and with the grooved portion of said part, ports in the rotating member communicating with said grooved portion of said part and with the cavity or coring within said member, means for holding said grooved part tight against said rotating member and means for holding said pins fluid tight in said part.

In witness whereof I have hereunto set my hand this 26 day of December, 1906.

FRITZ WILHELM SCHROEDER.

Witnesses:
H. DALGAARD,
I. PATRICK.